US011046897B2

(12) United States Patent
Bai et al.

(10) Patent No.: US 11,046,897 B2
(45) Date of Patent: Jun. 29, 2021

(54) NAPHTHA HYDRODESULFURIZATION

(71) Applicant: ExxonMobil Research and Engineering Company, Annandale, NJ (US)

(72) Inventors: Chuansheng Bai, Phillipsburg, NJ (US); Majosefina Cunningham, Whitehall, PA (US); Gregory R. Johnson, Bound Brook, NJ (US); Wenyih F. Lai, Bridgewater, NJ (US); Brandon J. O'Neill, Lebanon, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 18 days.

(21) Appl. No.: 16/415,033

(22) Filed: May 17, 2019

(65) Prior Publication Data
US 2019/0375995 A1    Dec. 12, 2019

Related U.S. Application Data

(60) Provisional application No. 62/681,817, filed on Jun. 7, 2018.

(51) Int. Cl.
| | | |
|---|---|---|
| *C10G 45/00* | (2006.01) | |
| *C10G 45/12* | (2006.01) | |
| *B01J 29/48* | (2006.01) | |
| *B01J 29/70* | (2006.01) | |
| *B01J 35/10* | (2006.01) | |
| *B01J 37/20* | (2006.01) | |

(52) U.S. Cl.
CPC ............. *C10G 45/12* (2013.01); *B01J 29/48* (2013.01); *B01J 29/703* (2013.01); *B01J 35/1061* (2013.01); *B01J 37/20* (2013.01); *B01J 2229/60* (2013.01); *C10G 2300/1044* (2013.01); *C10G 2400/02* (2013.01)

(58) Field of Classification Search
None
See application file for complete search history.

(56) References Cited

U.S. PATENT DOCUMENTS

| 5,985,136 A | 11/1999 | Brignac et al. |
|---|---|---|
| 6,013,598 A | 1/2000 | Lapinski et al. |

(Continued)

OTHER PUBLICATIONS

Greeley et al., "Selective Cat Naptha Hydrofining With Minimal Octane Loss", National Petrochemical & Refiners Association Annual Meeting, Paper AM-99-31, 1999, San Antonio, pp. 1-7.

(Continued)

*Primary Examiner* — Prem C Singh
*Assistant Examiner* — Brandi M Doyle
(74) *Attorney, Agent, or Firm* — Robert A. Migliorini

(57) ABSTRACT

Methods are provided for performing selective hydrodesulfurization on a naphtha boiling range stream naphtha boiling range portion of a feed. It has been unexpectedly discovered that hydrodesulfurization with improved octane retention can be performed by using a catalyst that comprises CoMo supported on a catalyst support that includes a zeotype framework. By using a catalyst support including a zeotype framework, an unexpectedly high amount of octane in the naphtha boiling range portion of the hydrodesulfurized effluent is maintained.

20 Claims, 3 Drawing Sheets

(56) References Cited

U.S. PATENT DOCUMENTS

| | | | |
|---|---|---|---|
| 6,042,719 A * | 3/2000 | Shih | B01J 29/46 |
| | | | 208/143 |
| 8,216,958 B2 | 7/2012 | Wu et al. | |
| 8,288,305 B2 | 10/2012 | Bai et al. | |
| 2005/0023191 A1 * | 2/2005 | Shih | C10G 45/12 |
| | | | 208/216 R |
| 2010/0012554 A1 * | 1/2010 | Bai | B01J 21/08 |
| | | | 208/240 |
| 2017/0175011 A1 | 6/2017 | McCarthy et al. | |

OTHER PUBLICATIONS

The International Search Report and Written Opinion of PCT/US2019/032787 dated Aug. 2, 2019.

* cited by examiner

NAPHTHA HYDRODESULFURIZATION

CROSS-REFERENCE TO RELATED APPLICATIONS

This application claims priority to U.S. Provisional Application No. 62/681,817 filed Jun. 7, 2018, which is herein incorporated by reference in its entirety.

FIELD

Methods for desulfurization of naphtha boiling range fractions are provided.

BACKGROUND

One of the streams commonly included in commercial gasoline pools is naphtha derived from catalytic cracking, such as naphtha fractions from fluid catalytic cracking processes. Catalytic naphtha can be beneficial because catalytic naphtha typically has higher octane value than a virgin naphtha fraction. A portion of this increased octane value is due to the olefin content of the catalytic naphtha. However, catalytic naphtha also typically has a substantially higher sulfur content than the desired sulfur content in a finished gasoline. The sulfur content of catalytic naphtha can be reduced by hydroprocessing, but this also results in octane loss due to olefin saturation.

One method of performing hydrodesulfurization is SCANfining, which is a process developed by ExxonMobil. SCANfining is described in National Petrochemical & Refiners Association Annual Meeting Paper AM-99-31 titled "Selective Cat Naphtha Hydrofining with Minimal Octane Loss" and U.S. Pat. Nos. 5,985,136 and 6,013,598. Typical SCANfining conditions include one and two-stage processes for hydrodesulfurizing a naphtha feedstock. The feedstock is contacted with a hydrodesulfurization catalyst comprised of about 1 wt. % to about 10 wt. % $MoO_3$; and about 0.1 wt. % to about 5 wt. % CoO; and a Co/Mo atomic ratio of about 0.1 to about 1.0; and an average pore diameter of about 60 Angstroms to about 200 Angstroms.

More recent efforts to reduce or minimize octane loss during selective hydroprocessing have focused on use of catalysts including CoMo on silica supports. For example, U.S. Pat. Nos. 8,216,958 and 8,288,305 describe performing naphtha hydrodesulfurization with catalysts including CoMo on a silica support. Such catalysts can achieve additional octane preservation relative to a catalyst with CoMo supported on $Al_2O_3$, but the catalysts also includes a substantially higher content of CoMo in order to achieve high HDS activity.

While methods based on existing catalysts can preserve some octane during naphtha desulfurization, it would be desirable to have a naphtha desulfurization method that can provide sufficient sulfur removal from a catalytic naphtha fraction while further reducing or minimizing the loss of octane value.

SUMMARY

In various aspects, methods are provided for performing naphtha hydrodesulfurization. The methods can include sulfiding a hydrotreating catalyst comprising 1.5 wt % to 4.0 wt % cobalt oxide and 5.0 wt % to 15 wt % molybdenum oxide, relative to a weight of the hydrotreating catalyst, an organic dispersion agent, and a support comprising a zeotype framework having a 10-member ring pore channel as the largest size pore channel to form a sulfided hydrotreating catalyst. The sulfidation can be performed in-situ or ex-situ. Examples of suitable zeotype frameworks include, but are not limited to, MEL (ZSM-11) and MRE (ZSM-48). Optionally, the support can further include a binder. A feed comprising a naphtha boiling range portion can then be exposed to the sulfided hydrotreating catalyst under selective hydrodesulfurization conditions to form a hydrotreated effluent. The naphtha boiling range portion of the feed can include 5.0 wt % or more of olefins. The selective hydrodesulfurization conditions can be effective for preserving octane in the naphtha boiling range portion of the hydrotreated effluent while also being effective for performing 92% or more desulfurization of the naphtha boiling range portion of the feed.

DETAILED DESCRIPTION

Overview

Figure 1:
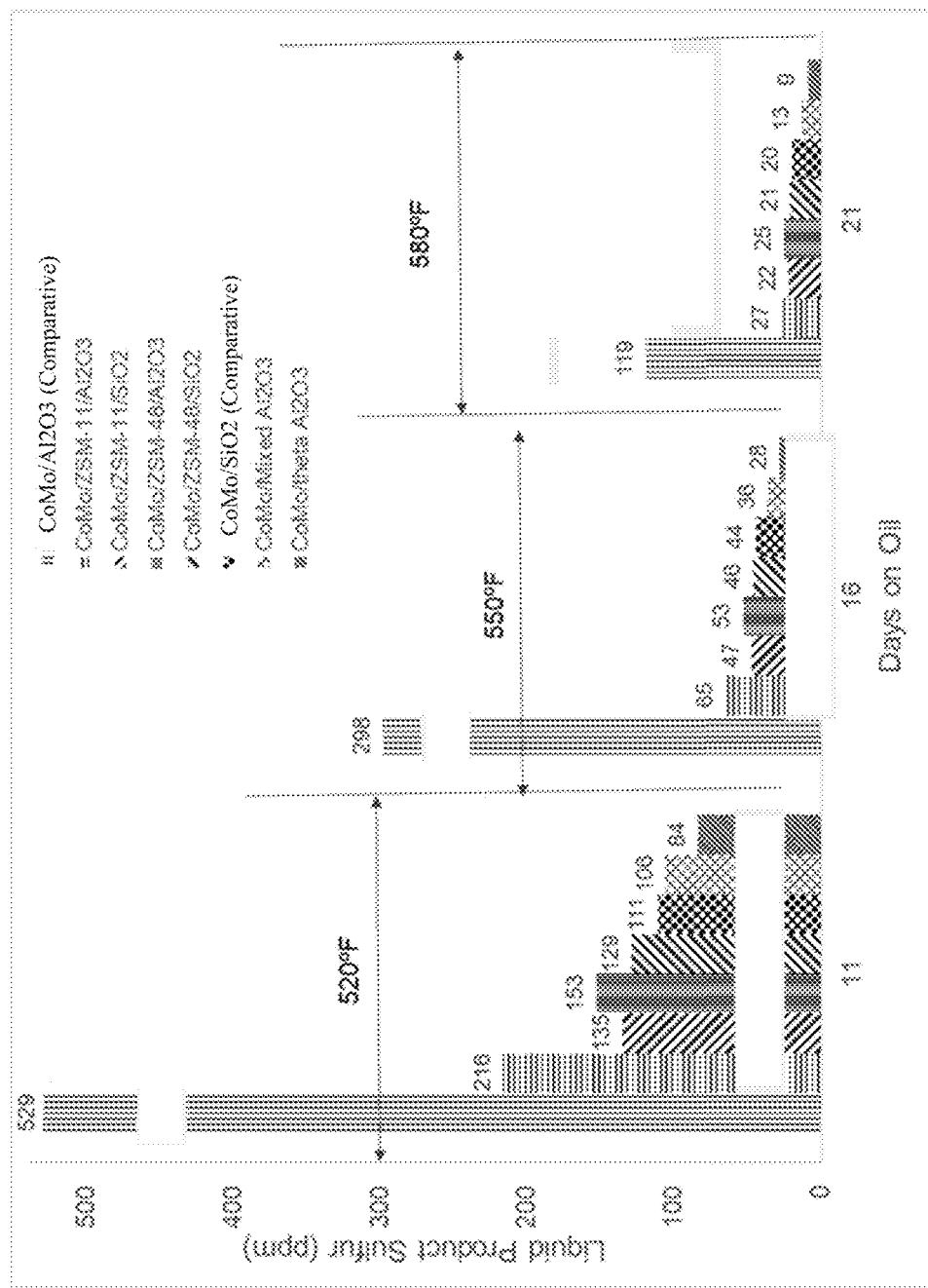
FIG. 1 shows sulfur contents for hydroprocessed effluents formed by hydroprocessing of a naphtha feed with various selective hydrodesulfurization catalysts.

In various aspects, systems and methods are provided for performing selective hydrodesulfurization on a naphtha boiling range stream. Selective hydrodesulfurization corresponds to desulfurization under conditions that can reduce or minimize octane loss during the desulfurization. It has been unexpectedly discovered that hydrodesulfurization with improved octane retention can be performed by using a catalyst that comprises CoMo supported on a catalyst support that includes a zeotype framework. By using a catalyst support including a zeotype framework, an unexpectedly high amount of octane in the naphtha boiling range portion of the hydrodesulfurized effluent was maintained.

The zeotype framework in the catalyst support can correspond to a framework that includes 10-member ring pore channels as the largest pore channel size. Suitable zeotype frameworks include MEL (ZSM-11) and MRE (ZSM-48). The catalyst support can also include a binder, such as an alumina or silica binder. By including a zeotype framework in the catalyst support, a lower content of Co and/or Mo can be included in the catalyst while still preserving or maintaining additional octane during a selective naphtha hydrodesulfurization process. The additional octane can be preserved or maintained based on a selective naphtha hydrodesulfurization process that is effective for performing 92% to 98% desulfurization of a naphtha feed and/or a naphtha boiling range portion of a feed, or 94% to 98%, or 95% to 98%, or 92% to 97%, or 94% to 97%. Desulfurization is defined as the weight of organic sulfur in a feed (such as mercaptans or thiophenes) that is converted to an inorganic form of sulfur (such as $H_2S$). Additionally or alternately, the selective naphtha hydrodesulfurization conditions can be effective for reducing the sulfur content of the hydrodesulfurized effluent and/or the naphtha boiling range portion of the hydrodesulfurized effluent to 100 wppm or less, or 75 wppm or less, or 50 wppm or less, such as down to 10 wppm or lower, or down to 1 wppm or lower.

Without being bound by any particular theory, it is believed that the zeotype framework can facilitate isomerization of portions of a naphtha feed. Conventionally, it is believed that having a silica support with a large average pore size is beneficial for reducing or minimizing olefin adsorption, and therefore reducing olefin saturation. By contrast, it has been discovered that using a support including a zeotype framework suitable for isomerization can provide improved olefin retention (and therefore improved octane retention). Any olefins that are isomerized are believed to have a reduced likelihood of being saturated during a hydrodesulfurization process. Additionally, conversion of linear chain compounds to branched compounds also tends to increase the octane rating of a compound. Although a catalyst including a zeotype framework can potentially have increased acidity relative to a refractory support, it is believed that the relatively low temperatures used in selective naphtha hydrodesulfurization result in only minimal cracking of a naphtha feed.

In addition to including a zeotype framework, the catalyst can also include an organic dispersion agent. The organic dispersion agent can correspond to one or more ligands, chelating agents, and/or other organic compound that can facilitate improving the dispersion of the Co and Mo on the support. Additionally or alternately, the organic dispersion agent can correspond to a compound derived from such a ligand, chelating agent, and/or other organic compound after sulfiding the catalyst and/or exposure of the catalyst to hydrodesulfurization conditions. Without being bound by any particular theory, it is believed that improving the dispersion of metal on the catalyst can further enhance the ability of the catalyst to achieve high HDS activity during hydrodesulfurization.

In this discussion, weights of metals supported on a catalyst support are reported as weights based on metals in their oxide form, unless otherwise specified. It is noted that hydrodesulfurization catalysts are typically in sulfided form when used for hydrodesulfurization of a feed. However, measurement of metal content on a catalyst support is typically performed with metal in an oxide form, so weights are reported for metals in oxide form for ease of comparison.

All numerical values within the detailed description and the claims herein are modified by "about" or "approximately" the indicated value, and take into account experimental error and variations that would be expected by a person having ordinary skill in the art.

Feedstock

In the discussion herein, reference is made to naphtha boiling range fractions (including feeds, products, or streams). The naphtha boiling range can be defined based on an initial boiling point and/or the temperature at which 5 wt % of the feed will boil (T5 boiling point). In some aspects, an initial boiling point and/or a T5 boiling point can correspond to roughly 35° C. (~100° F.). Thus, an initial boiling point or a temperature at which 5 wt % of the feed will boil can correspond to 35° C. In other embodiments, the initial boiling point and/or the T5 boiling point can be higher, such as at least about 50° C. Additionally or alternately, the naphtha boiling range can be defined based on a final boiling point and/or the temperature at which 95 wt % of the feed will boil (T95 boiling point) and/or the temperature at which 90 wt % of the feed will boil (T90 boiling point) In some aspects, the final boiling point and/or the T95 boiling point and/or the T90 boiling point can be 450° F. (232° C.) or less, or as 400° F. (204° C.) or less. As an example, a naphtha boiling range based on the above definitions can correspond to an initial boiling point, T5 distillation point, or T10 distillation point of 35° C. and a final boiling point, T95 distillation point, or T90 distillation point of 232° C. Such boiling ranges can correspond to either the boiling range of an entire feed or the boiling range of the naphtha portion of a feed. The boiling range of a feed or fraction can be determined by ASTM D86.

With regard to olefin content, suitable feedstocks can include feedstocks having a wide range olefin content. Some types of feeds, such as a feed based on a naphtha boiling range output from a hydrocracking process, can have an olefin content of 250 wppm or less, or 200 wppm or less. Other types of feeds, such as a feed based on the naphtha boiling range output from a coker, can have olefin contents between 1 wt % to 25 wt %. Still other types of feeds, such as a feed based on the naphtha boiling range output from a fluid catalytic cracking unit, can have an olefin content from 15 wt % to 40 wt %, or 15 wt % to 30 wt %. For some olefinic naphthas, still higher olefin contents may be possible, such as up to 60 wt % or less or even 70 wt % or less. Non-limiting examples of suitable feedstocks can include fluid catalytic cracking unit naphtha (FCC catalytic naphtha or cat naphtha), steam cracked naphtha, coker naphtha, or a combination thereof. This can include blends of olefinic naphthas (olefin content of 5 wt % or more) with non-olefinic naphthas (olefin content of 5 wt % or less). In some aspects, a naphtha feed for processing as described herein (including a feed corresponding to a blend of one or more olefinic naphthas with one or more non-olefinic naphthas) can have an olefin content of 5 wt % or more, or 10 wt % or more, or 15 wt % or more, or 20 wt % or more. For example, the olefin content can be 5 wt % to 70 wt %, or 5 wt % to 60 wt %, or 5 wt % to 50 wt %, or 10 wt % to 70 wt %, or 15 wt % to 70 wt %, or 15 wt % to 60 wt %. Olefinic naphtha refinery streams generally contain not only paraffins, naphthenes, and aromatics, but also unsaturates, such as open-chain and cyclic olefins, dienes, and cyclic hydrocarbons with olefinic side chains. An olefinic naphtha feedstock can also have a diene concentration up to 15 wt. %, but more typically less than 5 wt. % based on the total weight of the feedstock. High diene concentrations in gasoline blend stocks can be undesirable since they can result in a gasoline product having poor stability and color.

The sulfur content of a naphtha feedstock that has not been previously exposed to a hydrodesulfurization and/or hydrocracking process can be 100 wppm or more, or 300 wppm or more, or 500 wppm or more. For example, the sulfur content of the naphtha boiling range portion of a feedstock and/or a naphtha feedstock can be 300 wppm to 7000 wppm, or 500 wppm to 5000 wppm, or 300 wppm to 3000 wppm, or 1000 wppm to 7000 wppm. The sulfur will typically be present as organically bound sulfur. That is, as sulfur compounds such as simple aliphatic, naphthenic, and aromatic mercaptans, sulfides, di- and polysulfides and the like. Other organically bound sulfur compounds include the class of heterocyclic sulfur compounds such as thiophene and its higher homologs and analogs. Nitrogen can also be present in the feed. In an aspect, the amount of nitrogen can be 5 wppm to 500 wppm.

Additionally or alternately, a feedstock can include a naphtha boiling range portion of an effluent from a non-selective hydrodesulfurization process. This includes non-selective hydrodesulfurizations of naphtha boiling range feeds as well as hydrodesulfurizations of wider boiling range feeds that include, for example, both a naphtha boiling range portion and a higher boiling range portion.

Zeolitic Naphtha Desulfurization Catalysts

In various aspects, naphtha desulfurization can be performed using a catalyst that includes Co, Mo, an organic dispersion agent, and a support that includes a zeotype framework. The zeotype framework can optionally correspond to a zeolite, or the zeotype framework can include atoms different from silicon, aluminum, and oxygen. The zeotype framework can correspond to a framework with pore channels that are suitable for isomerization of organic compounds. For example, the zeotype framework can include a largest pore channel size that corresponds to a 10-member ring pore channel. Examples of suitable zeotype frameworks can include ZSM-11 (or more generally MEL zeotype frameworks) and ZSM-48 (or more generally ZSM-48 zeotype frameworks).

Catalysts can be optionally bound with a binder or matrix material prior to use. Binders can be resistant to temperatures for the use desired and are attrition resistant. Binders may be catalytically active or inactive and include other zeolites, other inorganic materials such as clays and metal oxides such as alumina, silica and silica-alumina. Clays may be kaolin, bentonite and montmorillonite and are commercially available. They may be blended with other materials such as silicates. Other binary porous matrix materials in addition to silica-aluminas include materials such as silica-magnesia, silica-thoria, silica-zirconia, silica-beryllia and silica-titania. Ternary materials such as silica-alumina-magnesia, silica-alumina-thoria and silica-alumina-zirconia can also be suitable for use as binders.

The amount of MEL framework molecular sieve (zeolite ZSM-11 or other zeolitic molecular sieve) in a catalyst including a binder can be from about 20 wt % zeolite (or zeolitic molecular sieve) to about 100 wt % zeolite relative to the combined weight of binder and zeolite, or 20 wt % to 90 wt % zeolite, or 20 wt % to 80 wt % zeolite.

After combining ZSM-11, ZSM-48, or another zeotype framework with any optional binder, the combined molecular sieve with or without binder can be extruded to form catalyst or support particles. Alternatively, catalyst particles may be formed by any other convenient method. The average pore site of the support and/or the catalyst can be 17.0 nm or less, or 16.0 nm or less, or 15.0 nm or less, such as down to 3.0 nm or possibly still lower. After forming catalyst particles, hydrodesulfurization metals and a dispersion agent can be added to the catalyst particles by any convenient method, such as impregnation. Hydrodesulfurization metals and dispersion agent can also be added during the mulling and extrusion process.

Impregnation, such as impregnation by incipient wetness or ion exchange in solution, is a commonly used technique for introducing metals into a catalyst that includes a support. During impregnation, a support is exposed to a solution containing a salt of the metal for impregnation. There are many variables that can affect the dispersion of the metal salt during impregnation, including the concentration of the salt, the pH of the salt solution, the point of zero charge of the support material, but not excluding other variables that may also be important during incipient wetness or ion exchange impregnation. Multiple exposure steps can optionally be performed to achieve a desired metals loading on a catalyst. After impregnating a support with a metal salt, the support can be dried to remove excess water. The drying can be performed under any convenient atmosphere, such as air, at a temperature from about 80° C. to about 200° C. Optionally but preferably, when a dispersing agent is included in the impregnation solution, the catalyst particles are not calcined to avoid the decomposition of dispersion agent prior to sulfidation.

The cobalt and molybdenum salts used to impregnate the support may be any water-soluble salts. Preferred salts include carbonates, nitrates, heptamolybdate and the like. The amount of salt is such that the catalyst will contain from 1.5 wt % to 4.0 wt % cobalt oxide, based on total catalyst weight, and from 5.0 wt % to 1.5 wt % molybdenum oxide, or 5.0 wt % to 12 wt %, based on total catalyst weight.

The catalyst can also include one or more organic dispersion agents. Organic dispersion agents are organic additives that are hypothesized to aid in distributing the Co and Mo components on the support. In some aspects, the organic dispersion agents can contain oxygen and/or nitrogen atoms and include mono-dentate, bi-dentate and poly-dentate ligands. The organic ligands may also be chelating agents. Organic dispersion agents include at least one of carboxylic acids, polyols, amino acids, amines, amino alcohols, ketones, esters and the like. Examples of organic ligands include phenanthroline, quinolinol, salicylic acid, acetic acid, ethylenediaminetetraacetic acid (EDTA), cyclohexanediaminetetraacetic acid (CYDTA), alanine, arginine, triethanolamine (TEA), glycerol, histidine, acetylacetonate, guanidine, and nitrilotriacetic acid (NTA), citric acid and urea.

While not wishing to be bound to any particular theory, it is postulated that the organic dispersion agents form complexes with at least one of Co and Mo. These Co- and/or Mo-organic complexes interact with the catalyst support to disperse the metals more evenly across the surface of the catalyst support.

When metals are added to a catalyst by impregnation, the amount of dispersion agent in the impregnation solution can be selected based on the amount of metal in the solution. In some aspects, the molar ratio of dispersion agent to total metals in the solution can be about 0.1 to 5.0, or about 0.1 to 2.0, or about 0.1 to 1.0, or about 0.2 to 5.0, or about 0.2 to 2.0, or about 0.2 to 1.0, or about 0.3 to 5.0, or about 0.3 to 2.0, or about 0.3 to 1.0, or about 0.4 to 5.0, or about 0.4 to 2.0, or about 0.4 to 1.0. Additionally or alternately, the molar ratio of dispersion agent to Co metal can be about 0.5 to 10, or about 0.5 to 5.0, or about 0.5 to 3.0, or about 1.0 to 10, or about 1.0 to 5.0, or about 1.0 to 3.0.

The organic dispersion may be added to an aqueous solution of Co salt and/or Mo salt prior to contact with the catalyst support. One embodiment for impregnating a support with metal salt is by the incipient wetness method. In this method, an aqueous solution containing metal salts and organic dispersion agent is mixed with the support up to the point of incipient wetness using conventional techniques, i.e., techniques that are well known in the art of hydroprocessing catalyst preparation, manufacture, and use.

The manner of impregnation of the catalyst support by metal salt may be by impregnating the support with a mixture of a cobalt salt and organic ligand using incipient wetness, drying the impregnated support and then impregnating the dried support with a molybdenum salt solution or molybdenum salt solution containing organic dispersion agent up to the point of incipient wetness. In another aspect, the order of impregnation by cobalt salt followed by molybdenum salt may be reversed. In yet another embodiment, the support may be co-impregnated with a mixture of cobalt salt and molybdenum salt plus organic dispersion agent to incipient wetness. The co-impregnated support may be dried and the co-impregnation process repeated. In various aspects, the organic dispersion agent may be a single organic compound (such as an organic ligand) or may be a mixture of compounds (i.e., a mixture of ligands). After impregnation, the impregnated support isolated from the reaction mixture is heated and dried at temperatures in the range from 50° C. to 200° C. to form a catalyst precursor. The drying may be under vacuum, or in air, or inert gas such as nitrogen.

The dried catalyst precursor is treated with hydrogen sulfide at concentrations of from 0.1 vol % to 10 vol % based on total volume of gases present, for a period of time and at a temperature sufficient to convert metal oxide, metal salt or metal complex to the corresponding sulfide in order to form the HDS catalyst. The hydrogen sulfide may be generated by a sulfiding agent incorporated in or on the catalyst precursor. In an embodiment, the sulfiding agent is combined with a diluent. For example, dimethyl disulfide can be combined with a naphtha diluent. Lesser amounts of hydrogen sulfide may be used, but this may extend the time required for activation. An inert carrier may be present and activation may take place in either the liquid or gas phase. Examples of inert carriers include nitrogen and light hydrocarbons such as methane. When present, the inert gases are included as part of the total gas volume. Temperatures are in the range from 150° C. to 700° C., preferably 160° C. to 343° C. The temperature may be held constant or may be ramped up by starting at a lower temperature and increasing the temperature during activation. Total pressure is in the range up to 5000 psig (~34.5 MPa-g), preferably 0 psig to 5000 psig (~101 kPa-a to ~34.5 MPa-g), more preferably 50 psig to 2500 psig (~0.4 MPa-g to ~17.4 MPa-g). If a liquid carrier is present, the liquid hourly space velocity (LHSV) is from 0.1 hr$^{-1}$ to 12 hr$^{-1}$, preferably 0.1 hr$^{-1}$ to 5 hr$^{-1}$ The LHSV pertains to continuous mode. However, activation may also be done in batch mode. Total gas rates may be from 89 m$^3$/m$^3$ to 890 m$^3$/m$^3$ (500 to 5000 scf/B).

Catalyst sulfiding may occur either in situ or ex situ. Sulfiding may occur by contacting the catalyst with a sulfiding agent, and can take place with either a liquid or gas phase sulfiding agent. Alternatively, the catalyst may be presulfurized such that $H_2S$ may be generated during sulfiding. In a liquid phase sulfiding agent, the catalyst to be sulfided is contacted with a carrier liquid containing sulfiding agent. The sulfiding agent may be added to the carrier liquid or the carrier liquid itself may be sulfiding agent. The carrier liquid is preferably a virgin hydrocarbon stream and may be the feedstock to be contacted with the hydroprocessing catalyst but may be any hydrocarbon stream such as a distillate derived from mineral (petroleum) or synthetic sources. If a sulfiding agent is added to the carrier liquid, the sulfiding agent itself may be a gas or liquid capable of generating hydrogen sulfide under activation conditions. Examples include hydrogen sulfide, carbonyl sulfide, carbon disulfide, sulfides such as dimethyl sulfide, disulfides such as dimethyl disulfide, and polysulfides such as di-t-nonylpolysulfide. The sulfides present in certain feeds, e.g., petroleum feeds, may act as sulfiding agent and include a wide variety of sulfur-containing species capable of generating hydrogen sulfide, including aliphatic, aromatic and heterocyclic compounds.

The dried catalyst is not calcined prior to either sulfiding or use for HDS. Not calcining means that the dried catalyst is not heated to temperatures above 300° C., preferably not above 200° C. By not calcining the catalyst, from about 60% to about 100% of the dispersing agent remains on the catalyst prior to sulfiding or use for HDS.

Following sulfiding, the catalyst may be contacted with naphtha under selective hydrodesulfurization conditions. Selective hydrodesulfurization conditions include temperatures of from 150° C. to 400° C., pressures of from 0.4 MPa-g to 13.9 MPa-g (~50 to ~2000 psig), liquid hourly space velocities of from 0.1 hr$^{-1}$ to 12 hr$^{-1}$, and treat gas rates of from 89 m$^3$/m$^3$ to 890 m$^3$/m$^3$ (~500 to ~5000 scf/B). After hydrodesulfurization, the desulfurized naphtha can be conducted away for storage or further processing, such as stripping to remove hydrogen sulfide. The desulfurized naphtha is useful for blending with other naphtha boiling-range hydrocarbons to make mogas.

Example 1—Preparation of Alumina Bound Extrudates

Extrudates of ZSM-11/$Al_2O_3$ (65 wt % ZSM-11, 35 wt % $Al_2O_3$ binder) extrudates (1/16 inch in diameter, quadrilobe shape) were used as support for CoMo deposition. The extrudates were roughly 1.6 mm in diameter and had a quadrilobe shape. Based on absorption of distilled water, the solution absorption capacity of the extrudates was estimated as 0.50 ml/g. The Co and Mo precursor compounds used in catalyst preparation were cobalt carbonate and ammonium heptamolybdate tetrahydrate. The organic dispersion agent used in catalyst preparation was citric acid. The volume of impregnation solution was 95% of the absorption capacity of the ZSM-11/$Al_2O_3$ (65/35) extrudates. To avoid the breaking of catalyst support extrudates during CoMo solution impregnation, the ZSM-11/$Al_2O_3$ extrudates were humidified with air bubbling through a water bath at room temperature for 16 hours. As an example of sample preparation, ~2.9 g of citric acid was dissolved in 5.0 g of deionized-$H_2O$. Roughly 1.0 g of cobalt carbonate was slowly added into citric acid solution. $CO_2$ bubbles came out upon addition of the cobalt carbonate. The solution was heated to 60° C. and maintained at 60° C. for ~1 hour to ensure the complete reaction between cobalt carbonate and citric acid. After the solution cooling to room temperature, ~2.8 g of ammonium heptamolybdate tetrahydrate was added to the mixture solution. The total solution volume adjusted with distilled water was ~9.5 ml. ~20.0 g of ZSM-11/$Al_2O_3$ (65/35) extrudates were impregnated with the CoMo-citrate solution by incipient wetness. After impregnation, the resulting catalyst was dried in air at 120° C. for roughly 16 hrs. The Co and Mo metal contents in the catalyst were 2.5 wt % CoO and 10 wt % $MoO_3$. This catalyst is referred to herein as Catalyst 1.

A similar procedure was used to impregnate extrudates composed of 50 wt % ZSM-11 and 50 wt % $SiO_2$ (Catalyst 2); 65 wt % ZSM-48 and 35 wt % $Al_2O_3$(Catalyst 3); and 50 wt % ZSM-48 and 50 wt % $SiO_2$ (Catalyst 4). It is noted that the ZSM-11/$SiO_2$ and ZSM-48/$SiO_2$ catalysts used in the following examples were only partially ion-exchanged from Na-form to H-form.

Extrudates of θ-$Al_2O_3$(Catalyst 5) and mixed phase $Al_2O_3$ (Catalyst 6) were also impregnated in a similar manner. The θ-$Al_2O_3$ support corresponds to a high temperature (950° C.) calcined alumina. The θ-$Al_2O_3$ support has a lower surface area than a γ-$Al_2O_3$ support (see Table 1 below). The mixed phase alumina corresponds to a bimodal alumina support prepared by co-extrusion of γ-$Al_2O_3$ and θ-$Al_2O_3$.

The CoMo metal loading in the ZSM-48/$Al_2O_3$, ZSM-11/$SiO_2$, ZSM-48/$SiO_2$, θ-$Al_2O_3$, and mixed phase alumina catalysts was also 2.5 wt % CoO and 10 wt % $MoO_3$.

In addition to the catalysts described above, two additional commercially available catalysts were tested as comparative catalysts. One comparative catalyst corresponded to 1.2 wt % CoO and 4.5 wt % $MoO_3$ on an alumina support (Catalyst 7). Catalyst was made in a manner consistent with the description in U.S. Pat. No. 6,013,598. The other comparative catalyst corresponded to 5.0 wt % CoO and 20 wt % MoO$_3$ on a silica support (Catalyst 8). Catalyst 8 was made in a manner similar to the methods described in U.S. Pat. Nos. 8,216,958 and 8,288,305.

Samples of the catalyst supports used in Catalysts 1-8 were also characterized to determine surface area, pore volume, pore size, and Alpha value, as shown in Table 1. The surface area and pore volume were determined by BET (Brunauer, Emmett and Teller) analysis. The average pore diameter was then calculated based on the pore volume and surface area, using the relationship Average Pore Diameter=4×10$^4$×(Pore Volume/Surface Area), with the Pore Volume expressed in cm$^3$/g and the Surface Area expressed in m$^2$/g. The Alpha value test is a measure of the cracking activity of a catalyst and is described in U.S. Pat. No. 3,354,078 and in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395. For the Alpha values reported in Table 1, the acidity was measured based on n-hexane cracking.

TABLE 1

Catalyst Properties

| Catalyst Supports | Surface Area (m$^2$/g) | Pore Volume (ml/g) | Pore Size (nm) | Alpha Value |
|---|---|---|---|---|
| ZSM-11/Al$_2$O$_3$ (65/35) | 438 | 0.82 | 10.5 | 350 |
| ZSM-11/SiO$_2$ (50/50) | 126 | 0.43 | 13.1 | 22 |
| ZSM-48/Al$_2$O$_3$ (65/35) | 229 | 0.61 | 12.8 | 95 |
| ZSM-48/SiO$_2$ (50/50) | 143 | 0.51 | 14.8 | 0.5 |
| θ-Al$_2$O$_3$ | 129 | 0.57 | 12.5 | 3.6 |
| Mixed phase Al$_2$O$_3$ | 209 | 0.67 | 9.4 | 0.9 |
| γ-Al$_2$O$_3$ | 278 | 0.79 | 7.8 | 2 |
| SiO$_2$ | 114 | 0.56 | 19.8 | 0.4 |

It is noted that the γ-Al$_2$O$_3$ support from Table 1 is believed to be representative of the support used in Catalyst 7, while the SiO$_2$ support from Table 1 is believed to be representative of the support used in Catalyst 8.

As noted above, the ZSM-11/SiO$_2$ and ZSM-48/SiO$_2$ catalysts were not fully ion exchanged, and therefore were still partially in Na-form during the Alpha value characterization. This led to relatively low Alpha values, indicating a lower acidity than the corresponding ZSM-11/Al$_2$O$_3$ and ZSM-48/Al$_2$O$_3$ catalysts. It is believed that if the ZSM-11/SiO$_2$ and ZSM-48/SiO$_2$ catalysts had been fully exchanged to H-form, the corresponding Alpha values would have been substantially higher, such as roughly 200 for ZSM-11/SiO$_2$ and roughly 60 for ZSM-48/SiO$_2$.

Based on Table 1, the catalysts including both a zeotype framework and an alumina binder had a higher Alpha value relative to the catalysts including just bulk alumina or silica supports. Otherwise, the bulk alumina or silica supports include supports with combinations of apparently comparable surface areas, pore sizes, and pore volumes relative to the supports including both a zeotype framework and a binder.

Example 2—FCC Naphtha HDS Tests with TPR Unit

TPR (Three Phase Reactor) units were used to investigate desulfurization activity and octane preservation for the catalysts described in Example 1. As demonstrated below and in FIGS. 1-3, the catalysts including a zeotype framework in the catalyst support (ZSM-11 or ZSM-48) provided an unexpectedly beneficial combination of high activity for hydrodesulfurization while also producing a hydrodesulfurized product with the highest octane rating.

The TPR units were continuous flow, fixed-bed reactors, with the reactors immersed in a sand bath. A syringe pump was used to deliver a steady flow of feed into the reactors. A flow meter controlled the delivery of H$_2$, while a regulator was used to control the reactor pressure. Accumulators were used to collect the reaction products, with liquid products falling to the bottom of the accumulators while gas products exited through the top of the accumulators. A pressure regulator controlled the backend pressure. Product liquid was stripped in a fume hood with N$_2$ for 1 hour to remove dissolved H$_2$S. The S and N concentrations in the HDS products were analyzed, and first-order kinetics were used to calculate both HDS and HDN rate constants, assuming that reactivity of S and N species in the feed are equivalent. The RON and MON data were estimated by using gas chromatography analyses of paraffin, isoparaffin, olefins, normal paraffin, and aromatics data.

For each catalyst, 1.0 cm$^3$ of the catalyst was charged into the reactor. The catalyst for use in the reactor was formed by crushing the extrudates and sizing the crushed extrudate particles to be between 25 mesh and 60 mesh. In the reactor, the catalysts were sandwiched between two layers of (inert) silicon carbide. Table 2 shows the resulting weight of each type of catalyst in the reactor.

TABLE 2

Catalyst Weights for Desulfurization Testing

| Catalyst # | Catalysts | Volume (ml) (25/60 mesh) | Extrudate CBD (g/cm$^3$) |
|---|---|---|---|
| 1 | 2.5%CoO + 10%MoO$_3$/ZSM-11/Al$_2$O$_3$ (65/35) | 1.0 | 0.55 |
| 2 | 2.5%CoO + 10%MoO$_3$/ZSM-11/SiO$_2$ (50/50) | 1.0 | 0.74 |
| 3 | 2.5%CoO + 10%MoO3/ZSM-48/Al$_2$O$_3$ (65/35) | 1.0 | 0.80 |
| 4 | 2.5%CoO + 10%MoO3/ZSM-48/SiO$_2$ (50/50) | 1.0 | 0.73 |
| 5 | 2.5%CoO + 10%MoO3/theta Al$_2$O$_3$ | 1.0 | 0.81 |
| 6 | 2.5%CoO + 10%MoO$_3$/mixed Al$_2$O$_3$ | 1.0 | 0.59 |
| 7 | 1.2%CoO + 4.5%MoO$_3$/Al$_2$O$_3$ | 1.0 | 0.56 |
| 8 | 5%CoO + 20%MoO$_3$/SiO$_2$ | 1.0 | 0.73 |

To prepare the catalysts for use in desulfurization, the catalysts were sulfided by spiked straight run naphtha (total sulfur 2.5 wt %, of which 2.4 wt % was dimethyl disulfide as a spiking agent). The sulfidation was performed at an LHSV of 2.0 hr$^{-1}$ and a temperature of 450° F. (232° C.) for 10 hrs, and another 5 hrs at 650° F. (343° C.). The treat gas rate was 1500 SCF/B (~260 m$^3$/m$^3$) of 100% H$_2$ at pressure of 250 psig (~1.7 MPa-g). After a 5 hour hold at 343° C., the TPR reactor temperature was decreased to 520° F. (~270° C.), the feed rate was increased to 4.0 hr$^{-1}$ LHSV, and the treat gas rate was maintained at 1500 SCF/B (~260 m$^3$/m$^3$) total gas flow. The pressure of TPR reactors was maintained at 250 psig (~1.7 MPa-g).

After sulfiding, the catalysts were evaluated for hydrodesulfurization activity and octane preservation. The evaluation conditions included an LHSV of 4 hr$^{-1}$, 250 psig H$_2$ pressure (~1.7 MPa-g), and a temperature between 520° F.-580° F. (roughly 270° C.-305° C.), with 1500 SCF/B (260 m$^3$/m$^3$)

H$_2$ treat gas rate. During the catalyst testing, the first 11 days of testing were performed at ~270° C., the next 5 days were performed at ~288° C., and the final 5 days were performed at ~305° C. The feed used for catalyst evaluations was a naphtha fraction from a fluid catalytic cracking effluent that contained 1190 wppm S and 42 wppm N. The naphtha fraction had a bromine number of 62.4 g Br/100 g, a T5 of roughly 55° C., a T95 of 352° F. (~178° C.), and an API gravity of 54.

FIG. 1 shows results from the hydrodesulfurization of the naphtha feed over the various catalysts. FIG. 1 shows the amount of sulfur remaining in the total liquid product (C$_{5+}$, or ~10° C.+). In FIG. 1, day 11 corresponds to hydrodesulfurization at ~270° C., day 16 corresponds to hydrodesulfurization at ~288° C., and day 21 corresponds to hydrodesulfurization at ~305° C.

In FIG. 1, the sulfur content in the total liquid product from the comparative CoMo/Al$_2$O$_3$ catalyst at ~270° C. was 529 wppm, corresponding to 56% hydrodesulfurization (HDS). The S content in the liquid product for the comparative CoMo/SiO$_2$ catalyst was 111 wppm, and its HDS was 91%. Thus, the comparative CoMo/SiO$_2$ catalyst was more active than comparative CoMo/Al$_2$O$_3$ for hydrodesulfurization. This is consistent with the relative Co and Mo loadings on the comparative catalysts, as the comparative CoMo/Al$_2$O$_3$ catalyst had a metal loading of 1.2% CoO and 4.5% MoO$_3$ while the comparative CoMo/SiO$_2$ catalyst had a metal loading of 5.0% CoO and 20% MoO$_3$.

The sulfur content in the total liquid products from CoMo/ZSM-11/Al$_2$O$_3$ and CoMo/ZSM-48/Al$_2$O$_3$ were 216 wppm and 153 wppm, respectively. Similarly, the sulfur content in the total liquid products from CoMo/ZSM-11/SiO$_2$ and CoMo/ZSM-48/SiO$_2$ were 135 wppm and 129 wppm, respectively. The HDS % values for the catalysts including a zeotype framework in the support were between are 82% and 89%. Thus, the catalysts with zeotype frameworks in the catalyst support were substantially more active than comparative CoMo/Al$_2$O$_3$ catalyst while being only slightly less active than comparative CoMo/SiO$_2$ catalyst. The CoMo metal loading on the catalysts including a zeotype framework in the support was only half of the loading on the comparative CoMo/SiO$_2$ catalyst. Based on the large difference in metal loading between the comparative CoMo/SiO$_2$ catalyst and the catalysts with ZSM-11 or ZSM-48 in the catalyst support, the relatively small difference in HDS % values between the catalysts is unexpected. It is believed that the CoMo metal dispersions and metal usage efficiencies on the catalysts with ZSM-11 or ZSM-48 in the catalyst support were considerably improved relative to the comparative CoMo/SiO$_2$. It is also noted that the catalysts of CoMo supported on mixed phase Al$_2$O$_3$ and θ-Al$_2$O$_3$ are more active than comparative CoMo/SiO$_2$. The catalyst HDS activities observed at ~270° C. follow the trend: CoMo/θ-Al$_2$O$_3$>CoMo/mixed phase Al$_2$O$_3$>CoMo/SiO$_2$>CoMo/ZSM-48/SiO$_2$>CoMo/ZSM-11/SiO$_2$>CoMo/ZSM-48/Al$_2$O$_3$>CoMo/ZSM-11/Al$_2$O$_3$>CoMo/Al$_2$O$_3$.

As the hydrodesulfurization reaction temperature was increased to ~288° C., all of the catalysts became more active, with liquid product sulfur concentrations lower than those observed at ~270° C. The relative activity trends for the catalysts were similar to those observed at ~270° C., although at ~288° C., many of the catalyst HDS activities became close to each other. In particular, CoMo/θ-Al$_2$O$_3$ was the most active catalyst with 98% HDS, CoMo/mixed phase Al$_2$O$_3$ was second most active with 97% HDS, and CoMo/Al$_2$O$_3$ was the least active catalyst with 75% HDS. The remaining catalysts were similar in activity, with CoMo/SiO$_2$ and all of the catalysts include a zeotype framework in the catalyst support providing either 95% HDS or 96% HDS. Thus, at 288° C., the activity of the catalysts including a zeotype framework in the support was comparable to the activity of the comparative CoMo/SiO$_2$ catalyst. Similar results were also observed at ~305° C. Again, all catalysts became more active relative to ~288° C. The CoMo/θ-Al$_2$O$_3$ catalyst was still the most active catalyst with 99% HDS, while CoMo/Al$_2$O$_3$ was the least active catalyst with 90% HDS. All of the other catalysts provided 98% HDS.

Figure 2:
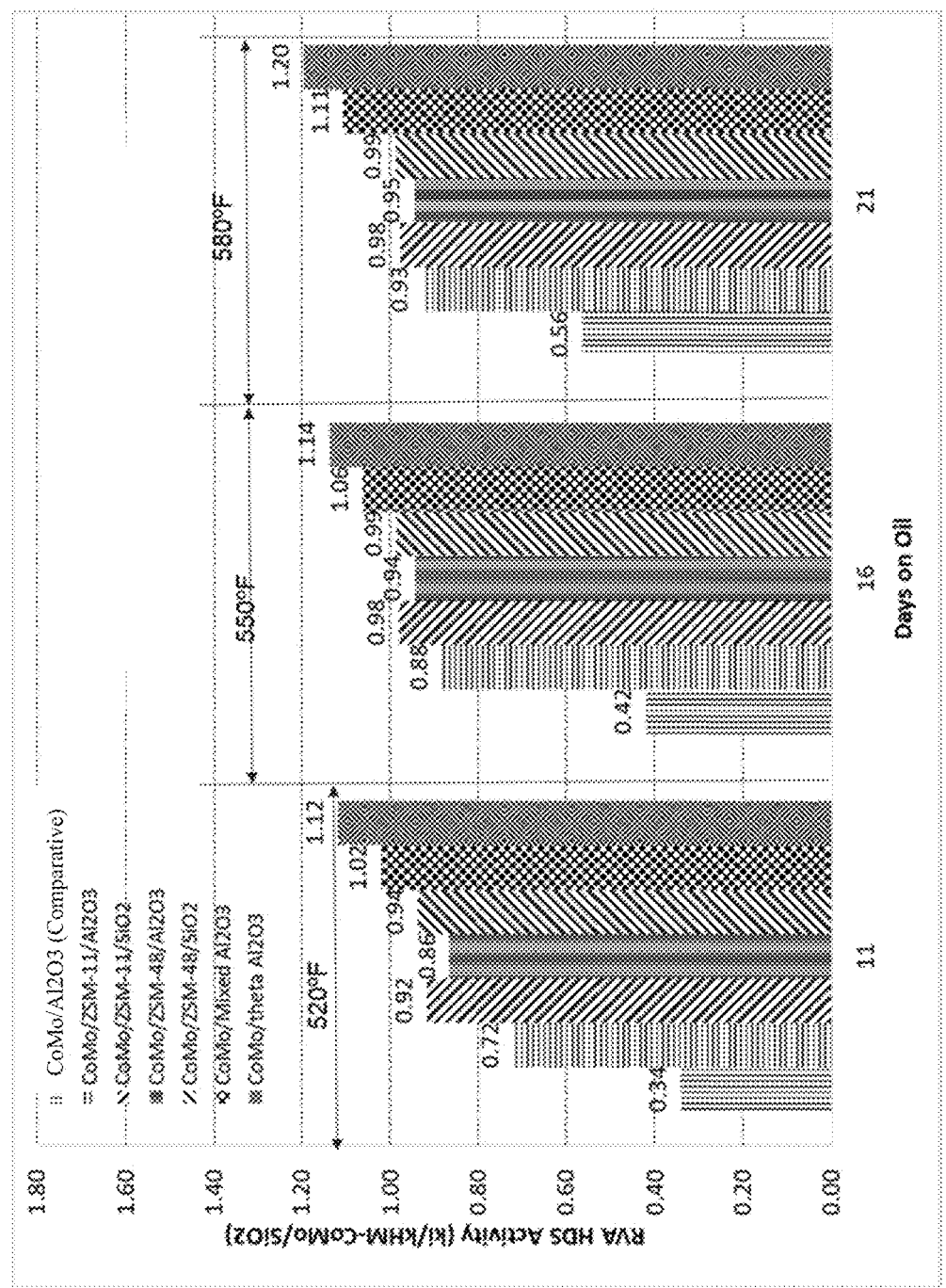
FIG. 2 shows relative volumetric catalyst activities for sulfur removal for the various selective hydrodesulfurization catalysts.

FIG. 2 shows the relative volumetric activities for the catalysts based on the data in FIG. 1 and an assumption of first order reaction kinetics. In order to show relative volumetric activity, the activity of the comparative CoMo/SiO$_2$ catalyst was assigned a value of 1.0 at each reaction temperature. The relative activities of the other catalysts are shown in FIG. 2. As shown in FIG. 2, the catalysts including ZSM-11 or ZSM-48 in the catalyst support all had similar but slightly lower activity relative to the activity of the comparative CoMo/SiO$_2$ catalyst.

In addition to sulfur content, the total liquid product was also characterized to determine octane number. The octane numbers reported in FIG. 3 correspond to values based on estimation of RON (Research Octane Number) and MON (Motor Octane Number) values from gas chromatograph analysis of species present in the total liquid product (paraffins, isoparaffins, olefins, normal paraffins, and aromatics). Octane number was then determined as (RON+MON)/2. These estimated values are believed to be representative of the values that would have been obtained according to ASTM D2699 and D2700. For purposes of clarity, octane number values in the claims are defined as (RON+MON)/2, with RON and MON determined by ASTM D2699 and 2700.

Figure 3:
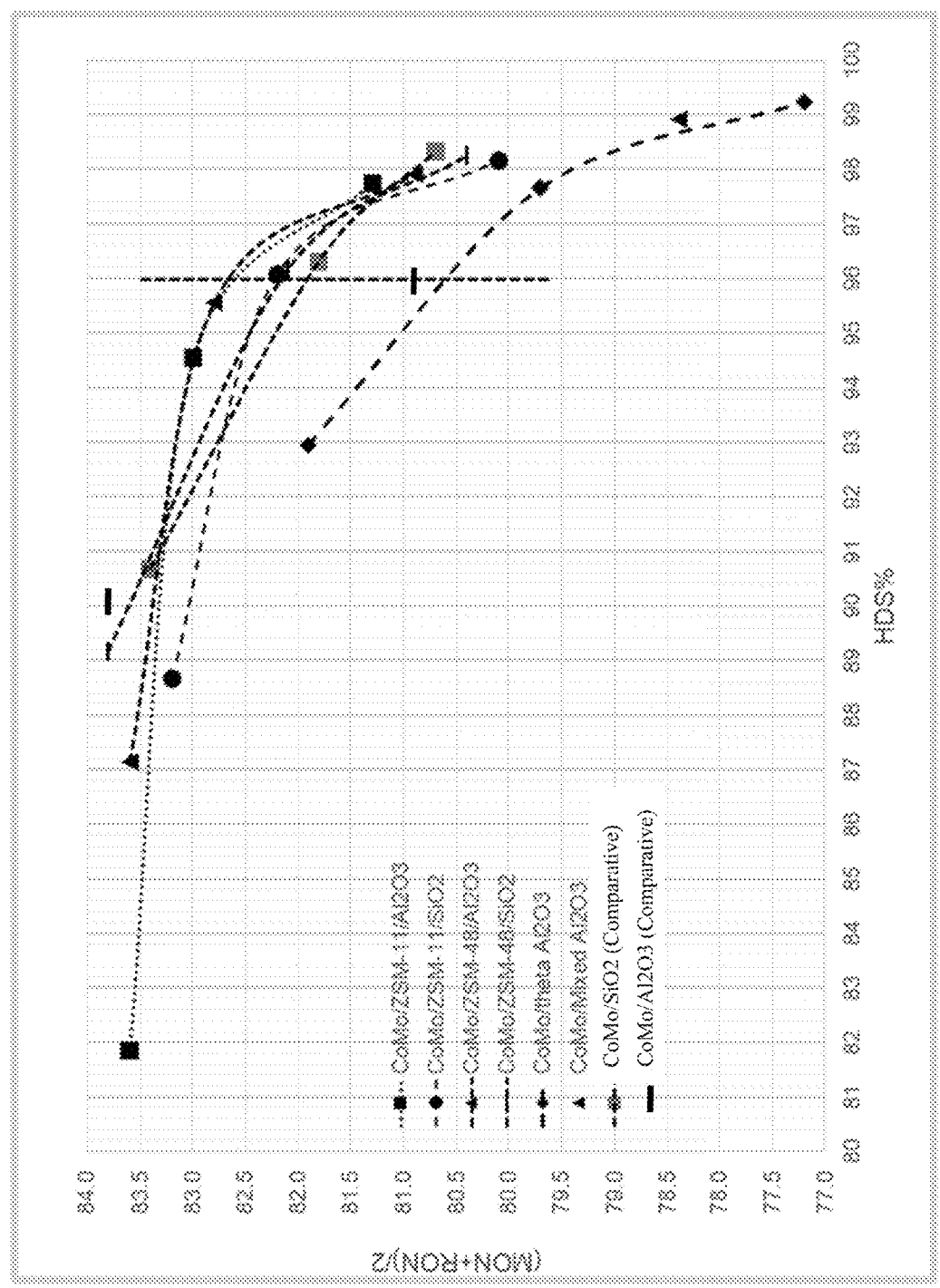
FIG. 3 shows octane values based on (RON+MON)/2 for the hydroprocessed effluents formed by hydroprocessing of a naphtha feed with the various selective hydrodesulfurization catalysts.

FIG. 3 provides three types of octane number information for each catalyst. First, the individual data points in FIG. 3 correspond to octane numbers for the various hydrodesulfurized total liquid products shown in FIG. 1. Second, for most of the catalysts, the individual data points were fit to a curve to allow for comparison at a constant desulfurization value. Third, a vertical line is included at 96% HDS, which corresponds to a typical desired level of HDS for a catalytic naphtha. At 96% HDS, the sulfur content of a catalytic naphtha will typically be low enough that it can be blended into a gasoline pool while still allowing the total gasoline pool to meet a desired sulfur specification of 15 wppm or less, or 10 wppm or less, or 8 wppm or less.

As shown in FIG. 3, the CoMo/θ-Al$_2$O$_3$ catalyst the lowest expected octane numbers for the total liquid product at 96% HDS. Although a curve fit is not provided for the CoMo/mixed-Al$_2$O$_3$ catalyst, it is believed that the curve fit would be similar to the curve for the CoMo/θ-Al$_2$O$_3$ catalyst. Thus, although the CoMo/θ-Al$_2$O$_3$ and the CoMo/mixed-Al$_2$O$_3$ catalysts have the highest volumetric HDS activity, these catalysts also produce naphtha products having the lowest octane number.

With regard to the comparative CoMo/Al$_2$O$_3$ and comparative CoMo/SiO$_2$ catalysts, at constant levels of HDS, the comparative CoMo/SiO$_2$ catalyst produces a total liquid product with an octane number that is roughly 1.0 higher than the octane number for the product from the comparative CoMo/Al$_2$O$_3$ catalyst. At 96% HDS, the comparative CoMo/SiO$_2$ catalyst is expected to produce a total liquid product with an octane number of 81.8, while the comparative CoMo/Al$_2$O$_3$ catalyst produced a total liquid product with an octane number of 80.8.

Unexpectedly, FIG. 3 shows that the catalysts including a zeotype framework in the support (ZSM-11 or ZSM-48) produce total liquid products (i.e., naphtha boiling range products) having higher octane values than either of the comparative catalysts. In FIG. 3, at a constant level of HDS, the catalysts including ZSM-11 or ZSM-48 with a silica binder produce total liquid products with an octane value that is roughly 0.4-0.5 higher (82.2 or 82.3) than the octane value of the total liquid product formed using the comparative CoMo/SiO$_2$ catalyst. The catalysts including ZSM-11 or ZSM-48 with an alumina binder provide a still larger unexpected advantage, with the resulting total liquid products having an octane value that is roughly 0.8-0.9 higher (82.6 or 82.7) than the octane value of the total liquid product formed using the comparative CoMo/SiO$_2$ catalyst.

Without being bound by any particular theory, it is believed that a substantial portion of the difference in octane improvement for catalysts having a silica binder versus an alumina binder in combination with a zeotype framework in the catalyst support is due to the incomplete ion exchange that was performed on the silica binder catalysts. In particular, it is believed that the acidity of the ZSM-11/Al$_2$O$_3$ and ZSM-48/Al$_2$O$_3$ catalyst supports is beneficial for increasing the amount of isomerization performed by the corresponding catalysts. Thus, if full ion exchange were performed on the ZSM-11/SiO$_2$ and ZSM-48/SiO$_2$ catalyst supports, it is believed that the corresponding catalysts would have also produced a total liquid product with a 0.8-0.9 octane number increase at constant HDS relative to the comparative CoMo/SiO$_2$ catalyst.

ADDITIONAL EMBODIMENTS

Embodiment 1

A method for performing naphtha hydrodesulfurization, comprising: sulfiding a hydrotreating catalyst comprising 1.5 wt % to 4.0 wt % cobalt oxide and 5.0 wt % to 15 wt % molybdenum oxide, relative to a weight of the hydrotreating catalyst, an organic dispersion agent, and a support comprising a zeotype framework having a 10-member ring pore channel as the largest size pore channel to form a sulfided hydrotreating catalyst; and exposing a feed comprising a naphtha boiling range portion to the sulfided hydrotreating catalyst under selective hydrodesulfurization conditions to form a hydrotreated effluent, the naphtha boiling range portion of the feed comprising 5.0 wt % or more of olefins (or 10 wt % or more, or 15 wt % or more).

Embodiment 2

The method of Embodiment 1, wherein the support comprises a MEL framework, a MRE framework, ZSM-11, ZSM-48, or a combination thereof.

Embodiment 3

The method of any of the above embodiments, wherein the support further comprises a binder comprising alumina, silica, titania, zirconia, or a combination thereof, the support optionally comprising a weight ratio of zeotype framework to binder of 0.2 to 10.

Embodiment 4

The method of any of the above embodiments, wherein the hydrotreating catalyst comprises an average pore size of 17.0 nm or less (or 16.0 nm or less, or 15.0 nm or less).

Embodiment 5

The method of any of the above embodiments, wherein the hydrotreating catalyst comprises 5.0 wt % to 12 wt % molybdenum oxide.

Embodiment 6

The method of any of the above embodiments, wherein the naphtha boiling range portion of the feed comprises a naphtha boiling range portion of a fluid catalytic cracking effluent, a steam cracker effluent, a coker effluent, or a combination thereof.

Embodiment 7

The method of any of the above embodiments, wherein the sulfidation is performed in-situ, or wherein the sulfidation is performed ex-situ.

Embodiment 8

The method of any of the above embodiments, wherein the naphtha boiling range portion of the feed comprises 300 wppm to 7000 wppm of sulfur.

Embodiment 9

The method of any of the above embodiments, wherein the selective hydrodesulfurization conditions are effective for reducing the sulfur content of the naphtha boiling to range portion of the hydrotreated effluent to 100 wppm or less (or 75 wppm or less), or wherein the selective hydrodesulfurization conditions are effective for performing 92% to 98% desulfurization of the naphtha boiling range portion of the feed (or 94% to 98%, or 95% to 98%), or a combination thereof.

Embodiment 10

The method of any of the above embodiments, wherein the selective hydrodesulfurization conditions comprise a temperature of 150° C. to 400° C., a hydrogen partial pressure of 0.4 MPa-g to 14.0 MPa-g, a liquid hourly space velocity of 0.1 hr$^{-1}$ to 12 hr$^{-1}$, and a hydrogen treat gas rate of 89 m$^3$/m$^3$ to 890 m$^3$/m$^3$.

Embodiment 11

The method of claim 1, wherein the feed comprises a T5 distillation point of 35° C. or more and a T95 distillation point of 232° C. or less, or wherein the naphtha boiling range portion of the feed comprises an initial distillation point of 35° C. or more and a final distillation point of 232° C. or less, or a combination thereof.

Embodiment 12

The method of any of the above embodiments, wherein the organic dispersion agent contains oxygen atoms, nitrogen atoms or both; or wherein the organic dispersion agent comprises at least one carboxylic acid, polyol, amino acid, amine, amide, amino alcohol, ketone or ester; or wherein the organic dispersion agent comprises at least one of phenanthroline, quinolinol, salicylic acid, acetic acid, ethylenediaminetetraacetic acid (EDTA), cyclohexanediaminetetraacetic acid (CYDTA), alanine, arginine, triethanolamine (TEA), glycerol, histidine, acetylacetonate, guanidine, nitrilotriacetic acid (NTA), citric acid or urea; or a combination thereof.

Embodiment 13

The method of any of the above embodiments, wherein the organic dispersion agent comprises a mono-dentate ligand, a bi-dentate ligand, a poly-dentate ligand, a chelating agent, or a combination thereof.

Embodiment 14

A hydrotreated effluent (or a naphtha boiling range portion of a hydrotreated effluent) formed according to the method of any of Embodiments 1-13.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method for performing naphtha hydrodesulfurization, comprising:
sulfiding a hydrotreating catalyst comprising 1.5 wt % to 4.0 wt % cobalt oxide and 5.0 wt % to 15 wt % molybdenum oxide, relative to a weight of the hydrotreating catalyst, an organic dispersion agent, and a support comprising a zeotype framework having a 10-member ring pore channel as the largest size pore channel, to form a sulfided hydrotreating catalyst, wherein the hydrotreating catalyst is not calcined prior to sulfidation; and
exposing a feed comprising a naphtha boiling range portion having a T90 distillation point of 204° C. or less to the sulfided hydrotreating catalyst under selective hydrodesulfurization conditions to form a hydrotreated effluent, the naphtha boiling range portion of the feed comprising 5.0 wt % or more of olefins.

2. The method of claim 1, wherein the support comprises a MEL framework, a MRE framework, or a combination thereof.

3. The method of claim 1, wherein the support comprises ZSM-11, ZSM-48, or a combination thereof.

4. The method of claim 1, wherein the support further comprises a binder.

5. The method of claim 4, wherein the binder comprises alumina, silica, titania, zirconia, or a combination thereof.

6. The method of claim 4, wherein the support comprises a weight ratio of zeotype framework to binder of 0.2 to 10.

7. The method of claim 1, wherein the hydrotreating catalyst comprises an average pore size of 17.0 nm or less.

8. The method of claim 1, wherein the hydrotreating catalyst comprises 5.0 wt % to 12 wt % molybdenum oxide.

9. The method of claim 1, wherein the naphtha boiling range portion of the feed comprises a naphtha boiling range portion of a fluid catalytic cracking effluent, a steam cracker effluent, a coker effluent, or a combination thereof.

10. The method of claim 1, wherein the sulfidation is performed in-situ.

11. The method of claim 1, wherein the sulfidation is performed ex-situ.

12. The method of claim 1, wherein the naphtha boiling range portion of the feed comprises 300 wppm to 7000 wppm of sulfur.

13. The method of claim 1, wherein the selective hydrodesulfurization conditions are effective for reducing a sulfur content of the naphtha boiling range portion of the hydrotreated effluent to 100 wppm or less, or wherein the selective hydrodesulfurization conditions are effective for performing 92% to 98% desulfurization of the naphtha boiling range portion of the feed, or a combination thereof.

14. The method of claim 1 wherein the selective hydrodesulfurization conditions comprise a temperature of 150° C. to 400° C., a hydrogen partial pressure of 0.4 MPa-g to 14.0 MPa-g, a liquid hourly space velocity of 0.1 hr$^{-1}$ to 12 hr$^{-1}$, and a hydrogen treat gas rate of 89 m$^3$/m$^3$ to 890 m$^3$/m$^3$.

15. The method of claim 1, wherein the feed comprises a T5 distillation point of 35° C. or more and a T95 distillation point of 232° C. or less, or wherein the naphtha boiling range portion of the feed comprises an initial distillation point of 35° C. or more and a final distillation point of 232° C. or less, or a combination thereof.

16. The method of claim 1, wherein the organic dispersion agent contains oxygen atoms, nitrogen atoms or both.

17. The method of claim 1, wherein the organic dispersion agent comprises a mono-dentate ligand, a bi-dentate ligand, a poly-dentate ligand, or a combination thereof.

18. The method of claim 17, wherein the organic dispersion agent comprises at least one carboxylic acid, polyol, amino acid, amine, amide, amino alcohol, ketone or ester.

19. The method of claim 17, wherein the organic dispersion agent is a chelating agent.

20. The method of claim 1 wherein the organic dispersion agent comprises at least one of phenanthroline, quinolinol, salicylic acid, acetic acid, ethylenediaminetetraacetic acid (EDTA), cyclohexanediaminetetraacetic acid (CYDTA), alanine, arginine, triethanolamine (TEA), glycerol, histidine, acetylacetonate, guanidine, nitrilotriacetic acid (NTA), citric acid or urea.

* * * * *